(12) United States Patent
Murillo et al.

(10) Patent No.: US 10,520,994 B2
(45) Date of Patent: Dec. 31, 2019

(54) STORAGE CARTRIDGE

(71) Applicant: Facebook, Inc., Menlo Park, CA (US)

(72) Inventors: Arlene Gabriana Murillo, Union City, CA (US); Wei Zhang, San Jose, CA (US); Christian Markus Petersen, Golden, CO (US); Yanbing Shao, Redwood City, CA (US); Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/885,312

(22) Filed: Jan. 31, 2018

(65) Prior Publication Data
US 2019/0235589 A1  Aug. 1, 2019

(51) Int. Cl.
*G06F 1/18* (2006.01)
*G06F 1/20* (2006.01)
*G06F 13/40* (2006.01)
*G06F 13/42* (2006.01)

(52) U.S. Cl.
CPC .............. *G06F 1/187* (2013.01); *G06F 1/20* (2013.01); *G06F 13/4081* (2013.01); *G06F 13/4221* (2013.01)

(58) Field of Classification Search
CPC ........ G06F 1/187; G06F 1/20; G06F 13/4081; G06F 13/4221
See application file for complete search history.

(56) References Cited

U.S. PATENT DOCUMENTS

| | | | | |
|---|---|---|---|---|
| 10,275,356 | B2 * | 4/2019 | Chou | G06F 12/0833 |
| 2009/0063895 | A1 * | 3/2009 | Smith | G06F 3/0607 |
| | | | | 714/6.32 |
| 2015/0277512 | A1 * | 10/2015 | Davis | G06F 1/183 |
| | | | | 361/679.31 |
| 2017/0168943 | A1 * | 6/2017 | Chou | G06F 12/0833 |
| 2017/0220505 | A1 * | 8/2017 | Breakstone | G06F 13/4022 |
| 2017/0357609 | A1 * | 12/2017 | Long | G06F 13/16 |
| 2018/0004695 | A1 * | 1/2018 | Chu | G06F 13/16 |
| 2018/0101500 | A1 * | 4/2018 | Heyd | G06F 13/4022 |
| 2018/0373664 | A1 * | 12/2018 | Vijayrao | G06F 13/4068 |

* cited by examiner

*Primary Examiner* — Hoa C Nguyen
*Assistant Examiner* — Christopher L Augustin
(74) *Attorney, Agent, or Firm* — Van Pelt, Yi & James LLP

(57) ABSTRACT

A storage cartridge is provided comprising a system connector configured to be hot-pluggable with an external receiving system. The storage cartridge includes a plurality of storage receiving connectors, each of which can be configured to receive either a hot-pluggable storage drive or a storage drive that has not designed to be natively hot-pluggable. In some embodiments, each of the plurality of storage receiving connectors is configured to receive a storage drive that has not been designed to be natively hot-pluggable. In addition, electrical connections are provided between the system connector and the plurality of storage receiving connectors that enable a plurality of the not natively hot-pluggable storage drives engaged with the storage cartridge to communicate with the external receiving system via the system connector configured to be hot-pluggable.

20 Claims, 6 Drawing Sheets

STORAGE CARTRIDGE

BACKGROUND OF THE INVENTION

Hot pluggable devices have an ability to connect and disconnect from a running computer without having to shut down the computer. In this manner, hot pluggable devices can be installed, replaced, and connected to a running computer and operate nearly instantaneously allowing easy accessibility to equipment and the convenience of uninterrupted systems. A user can plug and unplug hot pluggable devices without causing system crashes, unexpected reboots or hangs, or having to reboot the system. A mechanism that supports hot plugging must be able to identify replaced or removed modules or devices. In addition, mechanical and electrical connections must be capable of safe removal without causing harm to the device or user.

BRIEF DESCRIPTION OF THE DRAWINGS

Various embodiments of the invention are disclosed in the following detailed description and the accompanying drawings.

DETAILED DESCRIPTION

Figure 1:
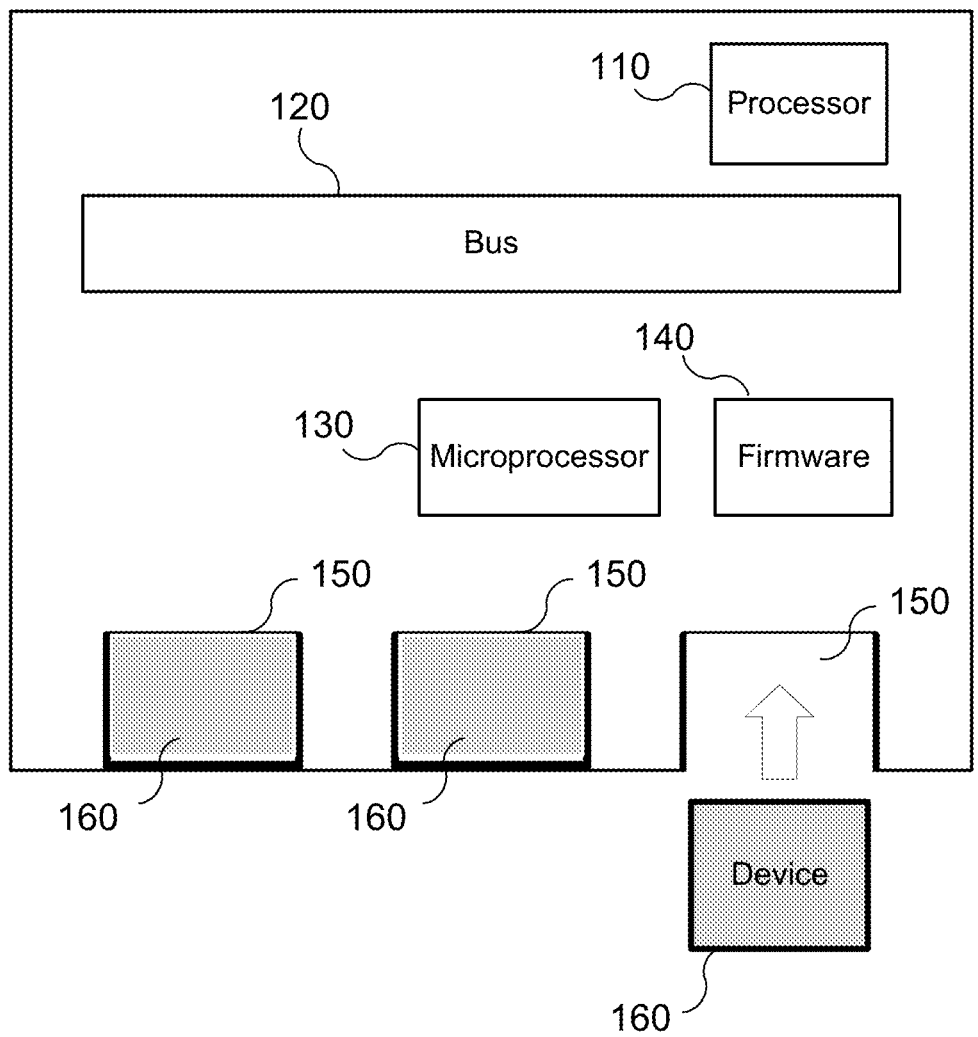
FIG. 1 is a block diagram illustrating an embodiment of an external receiving system for enabling devices that are not natively hot-pluggable to be hot pluggable from a common standard using a standard interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Hot pluggable devices provide an advantage in that users are able to insert and remove such devices from a running computer without having to shut down or reboot the system or causing any system crash. However, not all devices are configured with an ability to be hot pluggable. Accordingly, it would be advantageous to provide an ability for hot plugging a device that is not natively configured to be hot-pluggable so that it may be plugged and unplugged from a system without having to interrupt system operation.

This disclosure concerns a technique for enabling devices that are not natively hot-pluggable to be hot pluggable from a common standard using a standard interface. For example, a storage drive that utilizes the M.2 interface connector (conforming to M.2 specification that may use either a SATA or PCIe interface as part of the M.2 specification) that is specified to be not hot pluggable is made hot pluggable. A carrier or cartridge is provided having a system connector (e.g. with a U.2 interface connector, i.e., SFF-8639 connector, or a SSF-TA1002 interface connector) that is hot pluggable with an external receiving system. The carrier or cartridge can receive one or more devices that are not natively hot pluggable via one or more device receiving connectors. Using electrical connections between the system connector and each of the device receiving connectors, the carrier or cartridge electrically translates signals from the not natively hot-pluggable devices or storage drives engaged with the carrier or cartridge to allow each not natively hot-pluggable device to communicate with the external receiving system using a standard hot-pluggable interface. The carrier or cartridge includes a mechanism that facilitates and ensures a proper and secure connection of each not natively hot-pluggable device or storage drive to the carrier and includes thermal elements to help dissipate heat from the not natively hot-pluggable devices or storage drives engaged with the carrier or cartridge. In particular, by using a standard interface and common standard, the technique provides a user with an ability to connect both standard devices configured to engage with the standard interface and the disclosed carrier that can accommodate multiple devices that are not natively hot pluggable. In this manner, backwards compatibility is provided to allow connection of single storage components and hard drives, as well as carriers or cartridges configured to connect to multiple storage components.

More specifically, a storage cartridge is disclosed comprising a system connector configured to be hot-pluggable with an external receiving system. The storage cartridge includes a plurality of storage receiving connectors, each of which can be configured to receive either a hot-pluggable storage drive or a storage drive that has not designed to be natively hot-pluggable. In some embodiments, each of the plurality of storage receiving connectors is configured to receive a storage drive that has not been designed to be natively hot-pluggable. In addition, electrical connections are provided between the system connector and the plurality of storage receiving connectors that enable a plurality of the not natively hot-pluggable storage drives engaged with the storage cartridge to communicate with the external receiving system via the system connector configured to be hot-pluggable.

FIG. 1 is a block diagram illustrating an embodiment of an external receiving system 100 for enabling devices that are not natively hot-pluggable to be hot pluggable from a common standard using a standard interface. The system can be a machine comprising a server, storage device, networking device, and/or processing device. In the example shown in FIG. 1, system 100 comprises various components including Processor 110, Bus 120, Microprocessor 130, and Firmware 140. The system 100 also includes one or more recessed regions, bays, or slots 150, each configured to receive a device 160. In this example, multiple devices 160 can be inserted or plugged into the recessed regions or slots 150 of the machine and can be removably attached at an interface within each of the recessed regions or slots 150 configured to receive each device. Device 160 may be a standard storage device (e.g. a single hard drive) or a carrier or cartridge configured to receive multiple storage devices that are not natively hot-pluggable. Each of the bays/slots 150 is able to interchangeably accept a standard storage drive (e.g., Solid State Drive with a U.2 connector or a SSF-TA1002 interface connector) or a hot pluggable carrier/cartridge housing one or more not natively hot pluggable storage drives (e.g., a cartridge with a U.2 connector or a SSF-TA1002 interface connector that plugs into system 100 and housing a plurality of M.2 interface storage drives and circuitry to provide system 100 access to the of M.2 interface storage drives via the U.2 connector or SSF-TA1002 interface connector connected to system 100).

Bus 120 allows various components on external receiving system 100 and device 160 to communicate with each other. In some embodiments, Bus 120 is a PCI Express (Peripheral Component Interconnect Express), abbreviated as PCIe or PCI-e bus standard. PCIe is a high-speed serial computer expansion bus standard designed to provide improvements over and replace older standards such as PCI, PCI-X, and AGP bus standards. Compared to older standards, PCIe provides higher maximum system bus throughput, lower I/O pin count and smaller physical footprint, better performance scaling for bus devices, and a more detailed error detection and reporting mechanism. In this example, the PCIe bus standard is an appropriate choice because it also supports native hot-plug functionality.

Firmware 140 is configured to perform a translation between the operating system of the external receiving system and the carrier or storage cartridge and to detect insertion and removal of a carrier or storage cartridge. In particular, Firmware 140 is configured to detect that a device 160 has been inserted in to the system 100 and to determine whether the device is a single storage device or whether it is a carrier that includes multiple storage devices including not natively hot-pluggable devices. The multiple not natively hot-pluggable devices appear as two different drives to the operating system as a result of the translation performed by Firmware 140. For example, the firmware will detect whether a user has plugged into one of the bays/slots 150 a standard storage drive or a carrier/cartridge housing one or more not natively hot pluggable storage drives. Once the firmware detects the type of storage device that has been powered on and/or plugged into one of the bays/slots 150, the firmware provides appropriate system 100 and its operating system access to the detected storage drive or multiple storage drives of the cartridge. This may involve identifying the insertion and removal of the appropriate storage drives to the operating system as well as handing any required data selection, translation or operation to enable system 100 to access the multiple storage drives of the cartridge.

Additionally, Firmware 140 is configured to detect when a device 160 including a carrier or storage cartridge is unplugged, removed, powered off, or pulled out of the system. In the example shown, Firmware 140 detects that a connected carrier is not a connection to a single storage device, but is instead a connection to multiple storage devices, and also communicates to the operating system that two drives have been pulled out upon detecting that the carrier has been removed. This feature wherein Firmware 140 communicates to the operating system ensures that the technique is connector independent.

Firmware 140 can be low level firmware running on the system platform itself or it can be embedded various hardware components. Here, Firmware 140 is embedded in a PCIe switch that takes the PCIe bus and fans it out to more than one bus. Firmware 140 is configured to detect when devices are removed or inserted and to handle that mechanism within the PCIe framework correctly so that removal of the device does not flag an error or propagate an error up the stack and cause other problems in the system.

Figure 2:
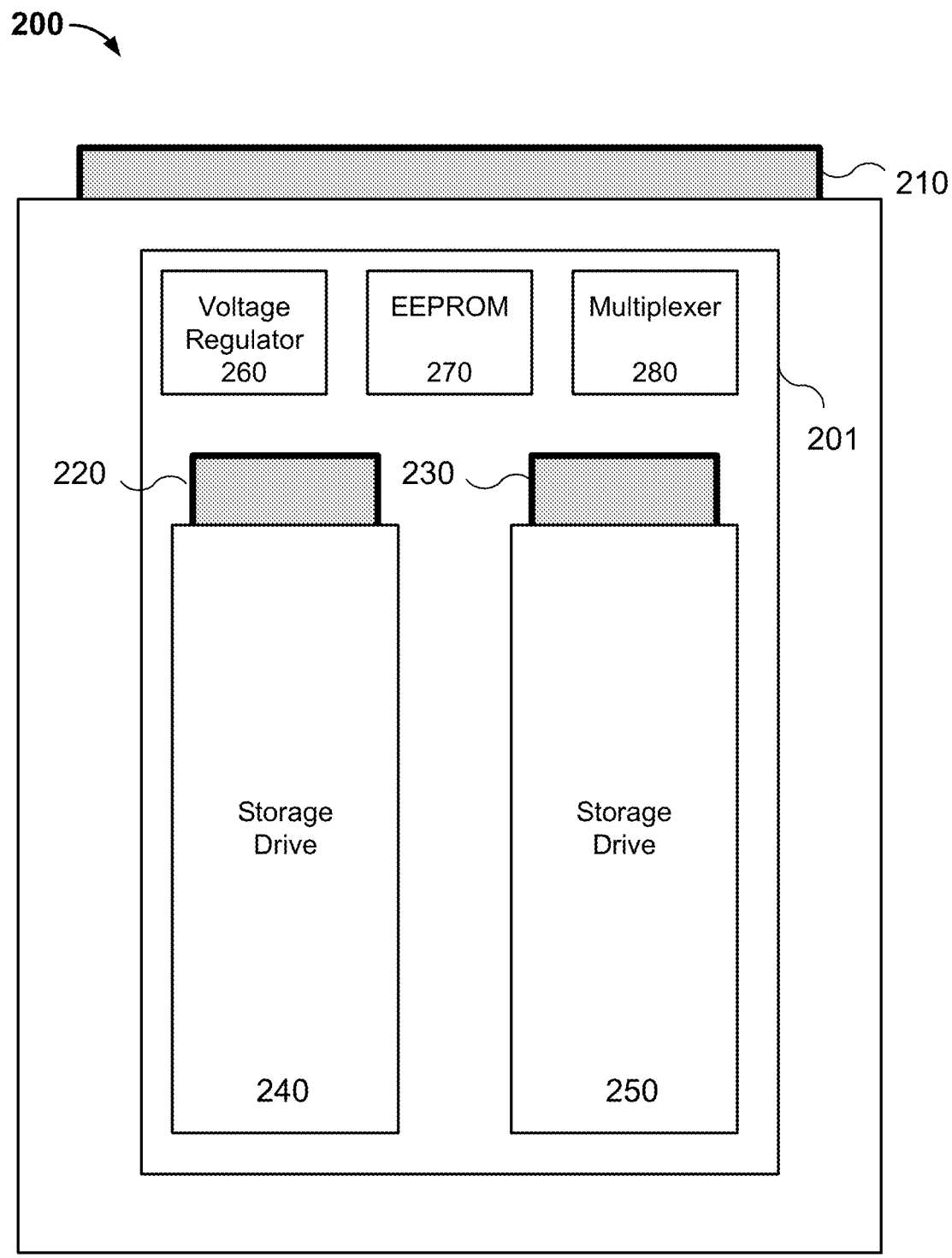
FIG. 2 shows an exemplary embodiment of a device that is hot pluggable with an external receiving system and one or more device receiving connectors configured to receive one or more devices that are not natively hot pluggable.

FIG. 2 shows an exemplary embodiment of a device, which in this example is a carrier or storage cartridge 200 having a system connector 210 (e.g., connector that conforms to the U.2 interface or SSF-TA1002 interface specification) that is hot pluggable with an external receiving system and one or more device receiving connectors 220 and 230 configured to receive one or more devices that are not natively hot pluggable. Device 200 can be one of multiple devices 160, as shown in FIG. 1, configured to connect to machine 100, for example, by insertion into each of the recessed regions or slots 150 of the system 100 configured to receive each device. In addition to the system connector 210, the carrier or storage cartridge 200 includes a PC or circuit board 201 on which the device receiving connectors 220 and 230 are mounted or soldered. PC or circuit board 201 also includes other components including Voltage Regulator 260, EEPROM 270, and Multiplexer 280, which are connected to each other via wiring (not shown). One or more devices that are not hot pluggable are connected or plugged in to the carrier or storage cartridge 200 via the one or more device receiving connectors 220 and 230. An example of connectors 220 and 230 are M.2 connector receiving sockets. In this example, the devices that are not natively hot pluggable are Storage Drive 240 and Storage Drive 250 (e.g., both using M.2 connectors), which are shown connected to the carrier or storage cartridge 200 via storage receiving connectors 220 and 230 respectively.

Although not shown, the system connector 210 (e.g., U.2 connector or SSF-TA1002 connector) is configured to couple or engage with a device that is natively hot pluggable. In particular, the system connector includes connector pins that are organized and designed to be physically staggered (e.g. configured with different pin lengths) to provide an interface configured to support hot plugging. For example, the interface is configured to handle spikes and rush current resulting from installing a device and it powering up. In some embodiments, the connector pins are configured to support multiple insertion and removal cycles.

In some embodiments thicker layers of gold plating are used and guidance features are mechanically molded into the device receiving connectors to ensure proper alignment when inserted a receiving connector. Connector pin layouts and the sizes of the connector pins themselves are configured to connect at particular times to allow the user to electrically control how power comes up and how the devices are protected. In some examples, additional guide slots, pins, notches, or holes are used to aid in proper insertion of a component between other live components.

An advantage of the technique disclosed herein is that it uses a common standard and standard interface (e.g. U.2 connector or SSF-TA1002 connector) and a bus standard for communicating between components that can support hot plugging (e.g. a PCIe bus). In other words, the technique does not rely on customizing or otherwise tailoring the design of the interface or system connector to allow devices that are not natively hot pluggable to be hot pluggable when connected. Instead, the technique supports connections to both a standard device such as a standard U.2 storage drive and the disclosed carrier having multiple M.2 storage drives that are not natively hot pluggable.

To this end, a mechanism is provided that supports hot plugging and is able to identify whether the device 160 inserted into the machine or system 100 is a standard device (e.g. a standard hard drive or hot-pluggable single storage device) or whether the device is the disclosed carrier or storage cartridge 200 having multiple storage drives connected via M.2 connectors. Given that the carrier or storage cartridge 200 can facilitate the connection of multiple storage devices (e.g. Storage Drive 240 and Storage Drive 250 of FIG. 2) using a single system connector 210, the mechanism must also allow identification and detection of component storage drives housed by cartridge 200.

The external receiving system 100 comprises a microcontroller (not shown) that runs firmware (e.g. Firmware 140) to detect and discover devices. In some embodiments, the external receiving system is configured to detect an identifying device such as EEPROM 270 of FIG. 2 to detect and identify whether the device 160 configured to be received in 150 of FIG. 1 is a carrier or storage cartridge 200 and not a standard storage device. For example, the external receiving system attempts to read data stored in EEPROM that identifies the type of device such as whether the device is a standard storage device configured to be connected via a U.2 connector or SSF-TA1002 connector that is plugged into the system. For example, the firmware may attempt to read the data stored in an EEPROM, if any, and if it fails to read data or detect the EEPROM, then the firmware may determine that a standard storage drive (i.e., not cartridge 20) has been connected. The data stored in the EEPROM may identify not only the existence/type/configuration of the cartridge that has been connected, but also type, number, and/or configuration of component storage drives (e.g., not natively hot pluggable storage drives) housed by the cartridge.

Alternatively, in other embodiments, Processor 110 or Microprocessor 130 can be used to identify whether the device 160 configured to be received at 150 of FIG. 1 is a carrier or storage cartridge 200 and not a single or standard storage device by, for example, detecting the presence of Multiplexer 280. In particular, the presence of Multiplexer 280 indicates that the device 160 is a carrier or storage cartridge 200 having one or more storage devices that are not necessarily natively hot pluggable. For example, detection of the existence of Multiplexer 280 corresponds to detection of storage cartridge 200 because Multiplexer 280 is absent on a standard single storage device that is directly hot pluggable. The presence of Multiplexer 280 can be detected for example by trying an address and receiving a valid response in return. A physical layer is provided to make the one or more storage devices hot pluggable which includes wiring that connects the connectors 210, 220 and 230. Additionally, Voltage Regulator 260 provides a voltage translation between a provided voltage (e.g., 12V provided via system connector 210) to another voltage required by the component storage drives (e.g., 3.3V needed for each of the multiple storage devices that are not natively hot-pluggable).

In the example shown, using electrical connections between the system connector 210 and each of the device receiving connectors 220 and 230 respectively, the carrier or storage cartridge 200 electrically translates signals from the not natively hot-pluggable devices or storage drives engaged with the carrier or cartridge (e.g. Storage Drive 240 and Storage Drive 250) to allow each not natively hot-pluggable device to communicate with the external receiving system 100 of FIG. 1 using a standard interface. In some embodiments, the carrier uses an industry standard interface having a form factor that is hot-pluggable by design such as U.2 or SFF (Small Form Factor) 8639 and maps signals to one or more devices that are not natively hot-pluggable and that have a different form factor such as an M.2. Created for client platforms, the M.2 is an expansion card form factor standard that is not designed to be hot-pluggable. The U.2 and M.2 components use Bus 120 (e.g. a PCIe bus) to communicate and connections via circuitry are provided for mapping the signals between the U.2 and M.2 components.

Figure 3:
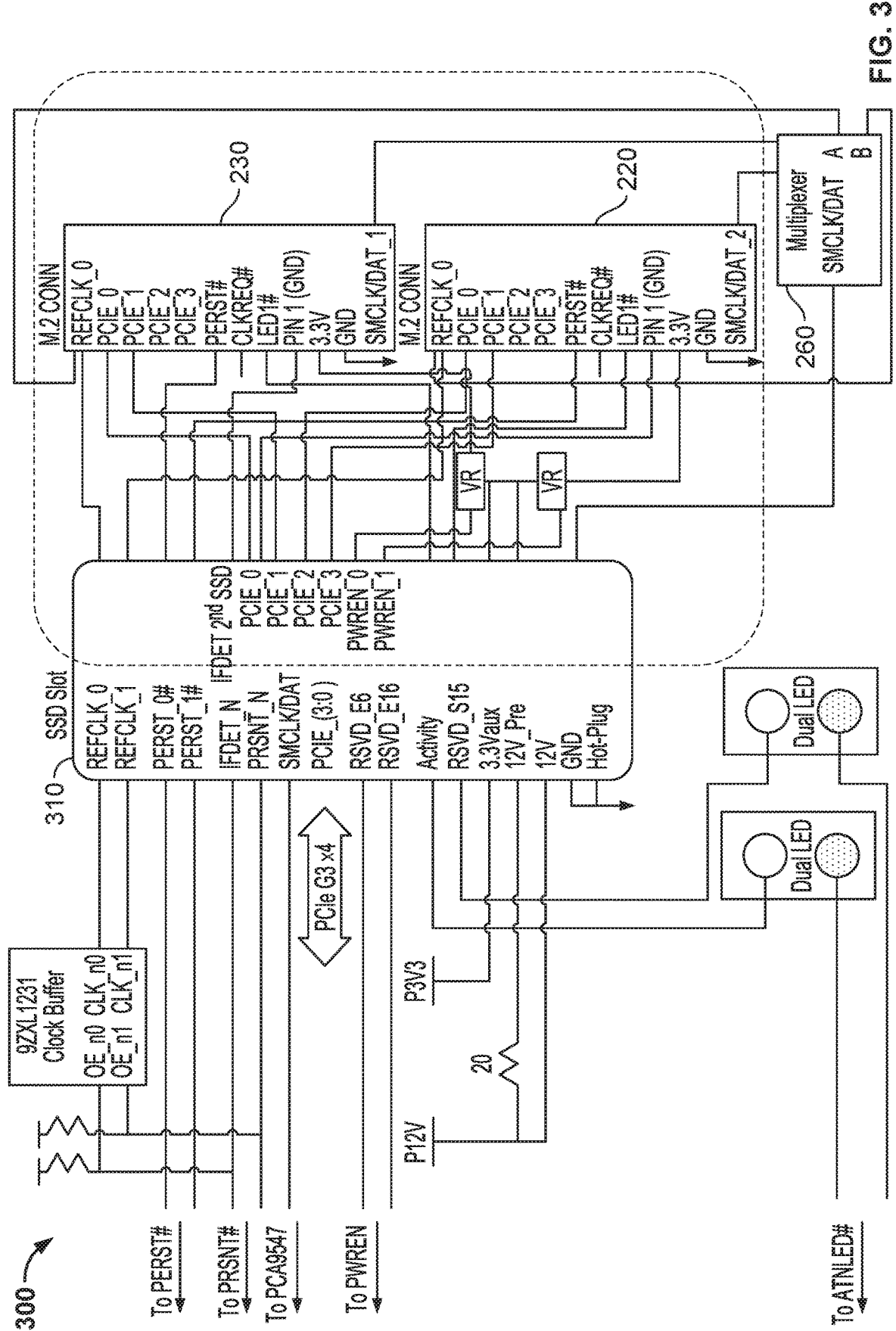
FIG. 3 shows a block diagram of an exemplary embodiment of circuitry provided to map signals between U.2 and M.2 connector pins.

FIG. 3 shows a block diagram of an exemplary embodiment of circuitry provided to map signals between the U.2 and M.2 connector pins. Carrier or storage cartridge 200 includes three connectors—a U.2 connector 310 configured to receive a U.2 component and two M.2 drive connectors 230 and 220 respectively, which are each configured to receive M.2 components. Carrier or storage cartridge 200 serves as an electrical translation board comprising wiring that connects the three connectors and circuitry that maps signals from a U.2 component at 310 to two M.2 components 230 and 220 respectively. Data channels are mapped so as to maintain compatibility with the U.2 connector pin layout on U.2 connector 310. In the exemplary implementation shown in FIG. 3, a one to two mapping is provided in which signals are split and in some instances mirrored. In addition, because the system connector is configured for a standard interface that includes single storage devices and hard drives, there is basically only one set of pins for interfacing with one drive. Accordingly, a multiplexer is used to allow the system 100 to communicate to two devices (e.g. Storage Drive 240 and Storage Drive 250) instead of what normally would be one in the case of a single hard drive. The benefit of this technique is that the mapping of signals on the carrier provides an ability to use a standard interface to system 100 without requiring a customized or specifically configured connection allowing for backward compatibility with existing systems.

The U.2 standard expects one set of system management bus (SMBus) wires whereas each of the M.2 storage devices each has its own SMBus. Thus a multiplexer is used to select one of the multiple M.2 storage devices using a selection signal sent via a data channel. For example, a side communication channel SMCLK/DAT of the SMBus is a two-wire bus comprising a clock and a data channel on the single drive connector 310. Typically, SMCLK is a high frequency clock that can be used for peripheral modules and DAT is a data channel. Note that the U.2 connector 310 and both M.2 connectors 230 and 220 have an SMCLK/DAT. In order to expose the two different storage drives (e.g. Storage Drive 240 and Storage Drive 250 of FIG. 2) to the operating system, an SMCLK/DAT signal must independently be sent to each one of the storage drive connectors (e.g. shown as SMCLK/DAT_1 on storage drive connector 230 and SMCLK/DAT_2 on storage drive connector 220 of FIG. 3). Multiplexer 260 provides a mechanism for selecting which storage drive connected via 230 and 220 is selected.

Multiplexer 260 is able to select whether SMCLK/DAT_1 or SMCLK/DAT_2 is connected to the SMCLK/DAT of connector 310 based on a selection signal/command received in-band via the SMCLK/DAT bus. For example, the firmware of the external receiving system inserts a selection signal/command (e.g., a specific address value or other identifier receives from Firmware 140 of FIG. 1) into the SMCLK/DAT bus data connection and this selection signal/command is detected and consumed (e.g., not passed through to storage devices) by Multiplexer 260. Multiplexer 260 selects the appropriate SMCLK/DAT_1 or SMCLK/DAT_2 for connection based on this selection signal/command. Thus this allows a command issued for a specific storage drive of cartridge 200 by an operating system of the external receiving system to be routed to the appropriate SMBus selected by Multiplexer 260.

As described above, the U.2 standard form is hot-pluggable while the M.2 form is not. The disclosed technique makes use of the U.2 standard form and through an appropriate mapping of signals or translation provided by firmware, electrical connections and components, makes use of the U.2 hot-pluggable form to provide a mechanism for connecting M.2 devices to the system such that the system sees the M.2 devices as hot-pluggable.

Figure 4A:
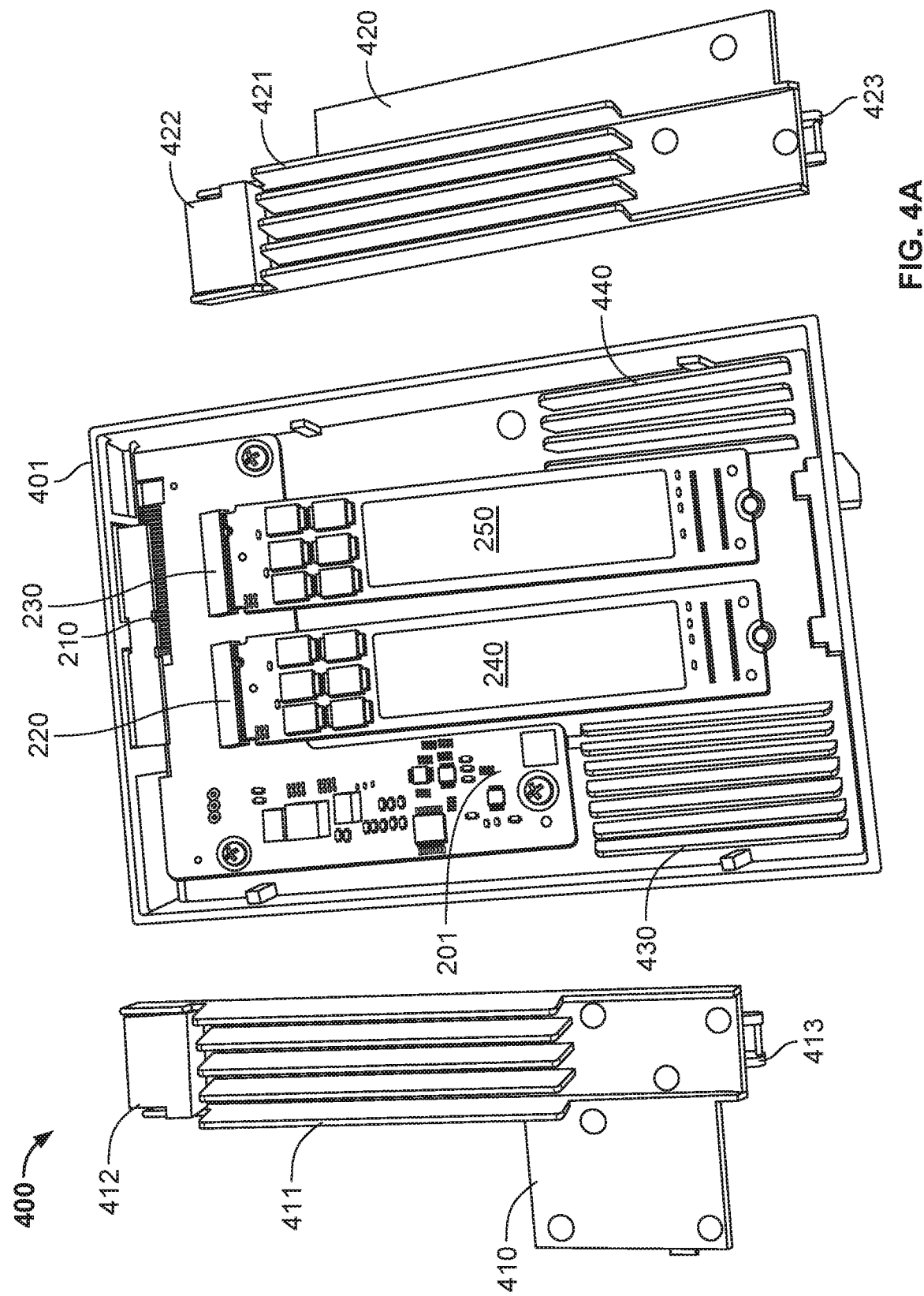
FIG. 4A shows an exemplary embodiment of a carrier including thermal elements to help dissipate heat from not natively hot-pluggable devices or storage drives connected to the carrier.

FIG. 4A shows an exemplary embodiment of a carrier including thermal elements to help dissipate heat from not natively hot-pluggable devices or storage drives connected to the carrier. Here, the carrier or storage cartridge 400 is shown uncovered with its various components exposed. In addition to system connector 210 and device receiving connectors 220 and 230 that are mounted on PC or circuit board 201, carrier or storage cartridge 400 of FIG. 4A includes a metal chassis 401 having fins 430 and 440 that act as heat sinks and are located on either side of Storage Drive 240 and Storage Drive 250. Storage drives such as the M.2 components shown in this example are high powered devices that dissipate heat but are not designed with their own heat sinks.

As shown in FIG. 4A, carrier or storage cartridge 400 includes a left module 410 comprising fins 411 and a right module 420 comprising fins 421 configured to mount on top of each of the two storage drives (e.g. Storage Drive 240 and Storage Drive 250) in the carrier or storage cartridge 400 to help dissipate heat generated by the storage drives. Although not shown, external receiving system 100 includes a cooling fan system comprising fan modules and a fan control board (FCB) to help dissipate heat away from the thermal elements (e.g., 411, 421, 430, 440) of cartridge 400 when cartridge 400 is inserted in receiving system 100.

Carrier or storage cartridge 400 includes a mechanism to facilitate and ensure a proper and secure connection of each of the not natively hot-pluggable devices or storage drives to the carrier. To this end, mechanical engagement elements including for example, latches, handles, or levers may be used to assist in proper insertion and removal of devices that either require large amounts of force to connect or disconnect, or to assist in the proper mating and holding together of power and communications connectors. Here, left and right modules 410 and 420 include engagement elements 413 and 423 respectively. Engagement elements 413 and 423 include a hole, opening, or hook element configured to couple or mate with a corresponding engagement element (not shown) on the chassis 401 to push a set of fins 411 and 421 (which act as heat sinks) on each module against each storage drive (e.g. Storage Drive 240 and Storage Drive 250). Note that while a particular configuration of mechanical coupling is shown in this example, other configurations can also be used to provide mechanical coupling of the modules to the chassis.

As another example of mechanical coupling to the chassis, left and right modules 410 and 420 include slidable engagement elements 412 and 422 respectively configured to clamp or otherwise couple each module to the chassis 401 of the carrier or storage cartridge 200. In particular, upon the application of pressure to engagement element 412 in the direction of fins 411, slidable engagement element 412 is configured to slide or move in a direction toward fins 411, from an initial position to a second position that closer to fins 411 on left module 410, which allows the left module to be placed on to the chassis 401. Upon releasing pressure on the slide mechanism, slidable engagement element 412 returns to its initial position and engages with a mating element on the chassis (not shown) which acts to clamp or hold the left module 410 securely on the chassis 401. Similarly, slidable engagement element 422 is configured to slide or move in a direction toward fins 411, from an initial position to a second position that closer to fins 421 on right module 420, which allows the right module to be placed on the chassis 401. Upon releasing pressure on the slide mechanism, slidable engagement element 422 returns to its initial position and engages with a mating element on the chassis (not shown) which acts to clamp or hold the right module 420 securely on the chassis 401.

Figure 4B:
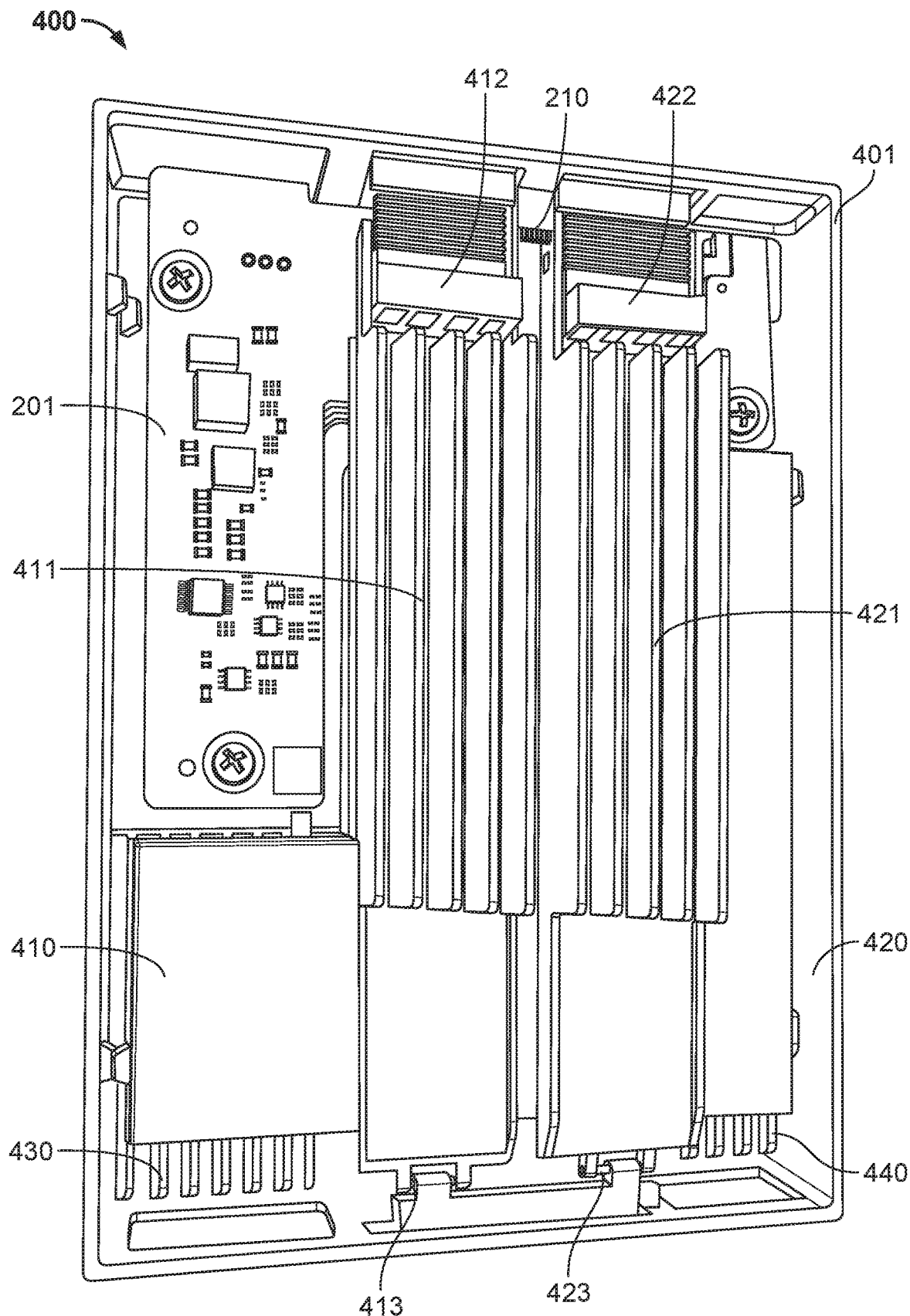
FIG. 4B shows the exemplary embodiment of the carrier in FIG. 4A with left and right modules mounted securely to the chassis to provide heat dissipation to storage devices that are connected to the carrier.

FIG. 4B shows the exemplary embodiment of the carrier in FIG. 4A with left and right modules mounted securely to the chassis via engagement elements as described above with respect to FIG. 4A to provide heat dissipation to storage devices (e.g. Storage Drive 240 and Storage Drive 250 of FIG. 2) that are connected to the carrier. As in FIG. 4A, the carrier or storage cartridge 400 is shown uncovered with its various components exposed. In some embodiments, thermal pads (not shown) are placed between the fins 411 on the left module and Storage Drive 240 and between the fins 421 on the right module and Storage Drive 250. The thermal pads help conduct heat from the storage devices to the fins by mechanically coupling a surface of the storage devices to the fins which serve as heat sinks.

Protective covering plates, shields, or bezels may be used on either the removable components or the main carrier device itself to prevent operator contact with live powered circuitry, to provide antistatic protection for components being added or removed, or to prevent the removable components from accidentally touching and shorting out the powered components in the operating device.

Figure 5:
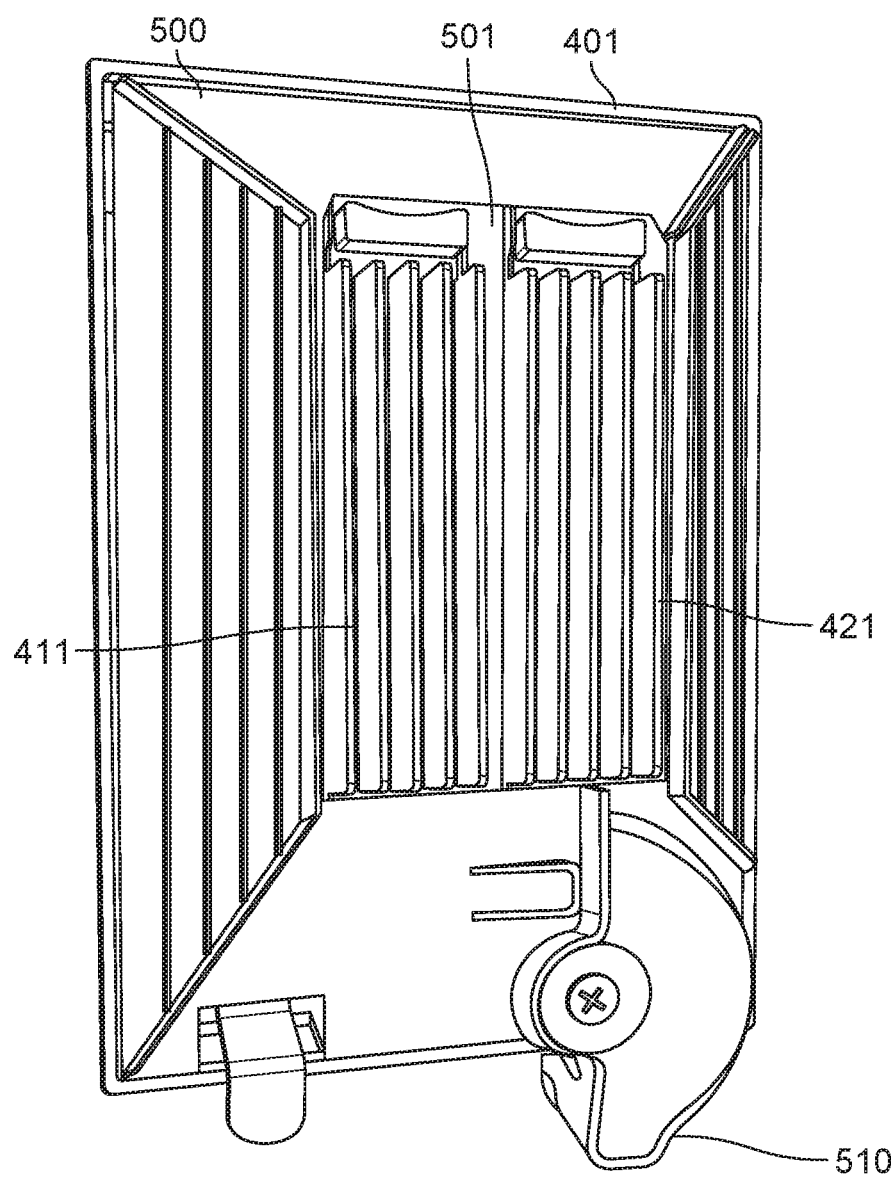
FIG. 5 shows an exemplary protective covering plate configured to protect the components on the carrier.

FIG. 5 shows an exemplary protective covering plate configured to protect the components on the carrier. Here, carrier or storage cartridge 400 is shown with covering plate 500 placed to cover and to protect the components on carrier or storage cartridge 400. Covering plate 500 can be mounted on the chassis 401 on a hinge or other clamping or coupling mechanism to allow the covering plate to be opened and closed in order to cover or to expose and provide access to the components on carrier or storage cartridge 400. Components on carrier or storage cartridge 400 that are protected by covering plate 500 include PC or circuit board 201, which can include various electrical components such as device receiving connectors 220 and 230, Voltage Regulator 260, EEPROM 270, and Multiplexer 280 as described with respect to FIG. 2 herein. One or more devices that are not hot pluggable such as Storage Drive 240 and Storage Drive 250 are also connected to carrier or storage cartridge 200 and protected by covering plate 500. In the example shown, covering plate 500 includes an opening 501 configured to allow the fins 411 and 422 of left and right modules 410 and 420 to be exposed and uncovered to facilitate heat dissipation. Additionally, a latch element 510 provides a mechanism for opening covering plate 500 to provide access to the components on the carrier in an open position, and for latching the covering plate securely on the chassis of the carrier in a closed position as shown in FIG. 5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage cartridge system, comprising:
    a system connector configured to be hot-pluggable with an external receiving system;
    a plurality of storage receiving connectors, wherein each of the plurality of storage receiving connectors is configured to receive a storage drive that has not been designed to be natively hot-pluggable;
    electrical connections between the system connector and the plurality of storage receiving connectors that enable a plurality of the not natively hot-pluggable storage drives engaged with the storage cartridge system to communicate with the external receiving system via the system connector configured to be hot-pluggable; and
    a multiplexer configured to selectively connect two pins of the system connector corresponding to a clock and a side communication data channel to a selected storage receiving connector of the plurality of storage receiving connectors selected based on a selection signal received in-band via at least one of the two pins of the system connector corresponding to the clock and the side communication data channel, wherein the multiplexer is configured to consume the selection signal provided in-band and remove the selection signal from the side communication data channel connected between the system connector and the selected storage receiving connector, and wherein the side communication data channel is separate from content data communication channels of each of the plurality of storage receiving connectors connected to the system connector.

2. The system of claim 1, wherein the system connector conforms to U.2 interface connector standard or to SSF-TA1002 interface connector standard.

3. The system of claim 1, wherein the storage receiving connectors conforms to M.2 interface connector standard.

4. The system of claim 1, wherein the electrical connections are configured to provide a mapping of signals from the system connector to the plurality of storage receiving connectors, and the multiplexer is configured to select which of the plurality of the not natively hot-pluggable storage drives engaged with the storage cartridge is able to communicate with the external receiving system via the system connector configured to be hot-pluggable.

5. The system of claim 4, wherein the multiplexer selects one system management bus for communication among system management buses of the plurality of the not natively hot-pluggable storage drives.

6. The system of claim 1 further comprising a circuit board with the electrical connections between the system connector and the plurality of storage receiving connectors.

7. The system of claim 1, further comprising a voltage regulator configured to provide a voltage translation between a voltage provided via the system connector and a voltage associated with each of the plurality of the not natively hot-pluggable storage drives configured to be connected via each of the plurality of storage receiving connectors.

8. The system of claim 1, wherein the system connector comprises connector pins configured to be physically arranged to provide an interface to support hot plugging.

9. The system of claim 8, wherein the connector pins comprise a protective layer of plating and guidance features, and the guidance features are mechanically molded into the system connector to ensure alignment.

10. The system of claim 1, further comprising an identifying device configured to identify the storage cartridge system as housing the plurality storage drives.

11. The system of claim 10, wherein the identifying device is an EEPROM.

12. The system of claim 1, wherein the external receiving system comprises a firmware configured to determine whether the storage cartridge system is connected to the external receiving system.

13. The system of claim 12, wherein the firmware is further configured to communicate to an operating system that removal of the storage cartridge system from the external receiving system corresponds to removal of the plurality of the not natively hot-pluggable storage drives engaged with the storage cartridge system.

14. The system of claim 1, wherein the external receiving system comprises a firmware configured to determine whether the storage cartridge includes the plurality of the not natively hot-pluggable storage drives.

15. The system of claim 1, wherein the plurality of the not natively hot-pluggable storage drives communicate with the external receiving system via a PCIe bus.

16. The system of claim 1, further comprising thermal elements configured to improve heat dissipation from each of the plurality of the not natively hot-pluggable storage drives engaged with the storage cartridge.

17. The system of claim 1, further comprising a metal chassis.

18. The system of claim 1, further comprising a plurality of thermal modules, wherein each thermal module comprises fins configured to dissipate heat, wherein each of the plurality of thermal modules is configured to be removably placed and in contact with each of the plurality of the not natively hot-pluggable storage devices.

19. The system of claim 18, wherein each of the plurality of thermal modules further comprises mechanical engagement elements configured to mate with corresponding mechanical engagement elements coupled to a chassis of the storage cartridge system.

20. The system of claim 1, further comprising a protective covering plate configured to latch on a chassis of the system.

* * * * *